(12) United States Patent
Nagahamaya et al.

(10) Patent No.: US 11,261,968 B2
(45) Date of Patent: Mar. 1, 2022

(54) SEALING DEVICE FOR DIFFERENTIAL MECHANISM

(71) Applicant: NOK CORPORATION, Tokyo (JP)

(72) Inventors: Hideaki Nagahamaya, Fukushima (JP); Kokichi Hamamoto, Fukushima (JP); Masayuki Tanida, Fukushima (JP); Takehiro Nakagawa, Fukushima (JP)

(73) Assignee: NOK CORPORATION, Tokyo (JP)

( * ) Notice: Subject to any disclaimer, the term of this patent is extended or adjusted under 35 U.S.C. 154(b) by 241 days.

(21) Appl. No.: 15/928,478

(22) Filed: Mar. 22, 2018

(65) Prior Publication Data

US 2018/0209546 A1    Jul. 26, 2018

Related U.S. Application Data

(63) Continuation of application No. PCT/JP2016/078189, filed on Sep. 26, 2016.

(30) Foreign Application Priority Data

Sep. 25, 2015 (JP) .............................. JP2015-187596

(51) Int. Cl.
*F16J 15/3232* (2016.01)
*F16J 15/3284* (2016.01)
(Continued)

(52) U.S. Cl.
CPC ....... *F16J 15/3232* (2013.01); *F16C 33/7823* (2013.01); *F16J 15/3236* (2013.01);
(Continued)

(58) Field of Classification Search
CPC ................ F16C 33/782; F16C 33/7823; F16C 33/7826; F16C 33/7876; F16C 33/7883;
(Continued)

(56) References Cited

U.S. PATENT DOCUMENTS 3,822,890 A * 7/1974 Bourgeois ............ F16J 15/3456
277/348
5,201,529 A * 4/1993 Heinzen ............... F16J 15/3256
277/351
(Continued)

FOREIGN PATENT DOCUMENTS

CN    203189533 U    9/2013
CN    104220768 A    12/2014
(Continued)

OTHER PUBLICATIONS

Chinese Office Action dated Apr. 11, 2019 for corresponding Chinese Application No. 201680055487.0 and English translation.
(Continued)

*Primary Examiner* — Nicholas L Foster
(74) *Attorney, Agent, or Firm* — Pearne & Gordon LLP

(57) ABSTRACT

A sealing device includes an annular reinforcing ring and an elastic body part, and the elastic body part has an annular seal lip, an annular dust lip, and an annular side lip. The side lip extends toward the outer side on an outer periphery side of the dust lip, and includes a distal end portion, a middle portion, and a root portion. The root portion is an annular portion, the middle portion is a portion that is outside of the root portion, and an annular portion that increases in diameter toward an outward side, and the distal end portion is a portion that is outside the middle portion, and an annular portion that increases in diameter toward an outward side. The distal end portion is bent to an inner periphery side from the middle portion.

13 Claims, 12 Drawing Sheets

(51) Int. Cl.
*F16C 33/78* (2006.01)
*F16J 15/3204* (2016.01)
*F16J 15/3236* (2016.01)
*F16J 15/3212* (2016.01)

(52) U.S. Cl.
CPC ........ *F16J 15/3284* (2013.01); *F16J 15/3204* (2013.01); *F16J 15/3212* (2013.01)

(58) Field of Classification Search
CPC ... F16J 15/3232; F16J 15/3264; F16J 15/3284
See application file for complete search history.

(56) References Cited

U.S. PATENT DOCUMENTS

| | | | | |
|---|---|---|---|---|
| 5,553,866 | A * | 9/1996 | Heinzen | F16J 15/3264 |
| | | | | 277/551 |
| 5,895,052 | A * | 4/1999 | Drucktenhengst | F16J 15/3256 |
| | | | | 277/351 |
| 6,892,587 | B2 * | 5/2005 | Mizutani | F16C 33/78 |
| | | | | 73/862.193 |
| 7,011,451 | B2 * | 3/2006 | Tajima | F16C 19/186 |
| | | | | 384/448 |
| 7,021,830 | B2 * | 4/2006 | Takehara | F16C 33/7823 |
| | | | | 384/486 |
| 7,084,537 | B2 * | 8/2006 | Mizutani | F16C 33/78 |
| | | | | 310/90 |
| 7,138,740 | B2 * | 11/2006 | Mizutani | F16C 33/78 |
| | | | | 310/90.5 |
| 7,362,023 | B2 * | 4/2008 | Mizutani | F16C 33/78 |
| | | | | 310/90 |
| 7,832,942 | B2 * | 11/2010 | Komori | B60B 27/00 |
| | | | | 384/544 |
| 8,303,190 | B2 * | 11/2012 | Shigeoka | B60B 27/0073 |
| | | | | 384/544 |
| 8,770,848 | B2 * | 7/2014 | Koma | B60B 27/001 |
| | | | | 277/919 |
| 8,864,139 | B2 * | 10/2014 | Greca | F16J 15/447 |
| | | | | 277/412 |
| 9,140,305 | B2 * | 9/2015 | Gulli | F16J 15/3264 |
| 9,534,635 | B2 * | 1/2017 | Norimatsu | F16C 19/386 |
| 9,797,453 | B2 * | 10/2017 | Norimatsu | F16C 33/7826 |
| 9,958,012 | B2 * | 5/2018 | Nakata | F16C 33/7863 |
| 10,352,451 | B2 * | 7/2019 | Kamiya | F16J 15/3204 |
| 10,479,139 | B2 * | 11/2019 | Tada | B60B 27/0094 |
| 2004/0105602 | A1 * | 6/2004 | Mizutani | F16C 33/78 |
| | | | | 384/448 |
| 2005/0089254 | A1 * | 4/2005 | Takehara | B60B 27/00 |
| | | | | 384/484 |
| 2005/0174001 | A1 * | 8/2005 | Mizutani | F16C 33/78 |
| | | | | 310/90 |
| 2005/0174011 | A1 * | 8/2005 | Mizutani | F16C 33/78 |
| | | | | 310/257 |
| 2006/0239597 | A1 * | 10/2006 | Mizutani | F16C 33/78 |
| | | | | 384/446 |
| 2007/0076994 | A1 * | 4/2007 | Norimatsu | F16C 33/7896 |
| | | | | 384/486 |
| 2007/0201782 | A1 * | 8/2007 | Miyagawa | B60B 27/0005 |
| | | | | 384/486 |
| 2009/0154855 | A1 * | 6/2009 | Kametaka | F16C 33/7876 |
| | | | | 384/485 |
| 2009/0154864 | A1 * | 6/2009 | Komori | F16C 33/805 |
| | | | | 384/589 |
| 2010/0129018 | A1 * | 5/2010 | Shigeoka | B60B 27/0084 |
| | | | | 384/544 |
| 2010/0272382 | A1 | 10/2010 | Yamamoto et al. | |
| 2011/0129176 | A1 * | 6/2011 | Koma | B60B 27/001 |
| | | | | 384/484 |
| 2011/0304197 | A1 * | 12/2011 | Norimatsu | F16C 33/7896 |
| | | | | 301/110 |
| 2015/0028663 | A1 | 1/2015 | Seki et al. | |
| 2015/0097340 | A1 * | 4/2015 | Gulli | F16J 15/3264 |
| | | | | 277/349 |
| 2016/0363170 | A1 * | 12/2016 | Nakata | F16C 33/7863 |
| 2018/0186181 | A1 * | 7/2018 | Tada | F16J 15/3232 |
| 2019/0113080 | A1 * | 4/2019 | Kamiya | F16C 33/805 |

FOREIGN PATENT DOCUMENTS

| | | | |
|---|---|---|---|
| JP | 08-247295 A | 9/1996 | |
| JP | 2005-048920 A | 2/2005 | |
| JP | 2006-342871 A | 12/2006 | |
| JP | 2008-111509 A | 5/2008 | |
| JP | 2009-103142 A | 5/2009 | |
| JP | 2009-127660 A | 6/2009 | |
| JP | 2009-299806 A | 12/2009 | |
| JP | 2014-126173 A | 7/2014 | |
| JP | 2015-105688 A | 6/2015 | |
| WO | WO-2019194185 A1 * | 10/2019 | ........... F16J 15/3232 |

OTHER PUBLICATIONS

Extended European Search Report dated May 15, 2019 for corresponding European Application No. 16848708.0.
Chinese Office Action dated Nov. 27, 2019 for corresponding Chinese Application No. 201680055487.0 and English translation.
International Search Report for corresponding International Application No. PCT/JP2016/078189 dated Nov. 8, 2016.
Written Opinion for corresponding International Application No. PCT/JP2016/078189 dated Nov. 8, 2016.
Rule 71(3) dated Apr. 9, 2020 for corresponding European Application No. 16848708.0.
Japanese Office Action dated Jun. 18, 2020 for corresponding Japanese Application No. 2017-540942 and English translation.
Notification of Grant Patent Right for Invention dated Jun. 1, 2020 for corresponding Chinese Application No. 201680055487.0 and English translation.
Ndonesian Office Action dated Jun. 23, 2020 for corresponding Indonesian Application No. P-00201802149 and English translation.
Decision of Refusal dated Nov. 30, 2020 for corresponding Japanese Application No. 2017-540942 and English translation.

* cited by examiner

FIG.11 -- PRIOR ART --

SEALING DEVICE FOR DIFFERENTIAL MECHANISM

CROSS REFERENCE TO RELATED APPLICATIONS

The present application is a continuation application of International Application No. PCT/JP2016/078189, filed on Sep. 26, 2016, which claims priority to Japanese Patent Application No. 2015-187596, filed on Sep. 25, 2015. The contents of these applications are incorporated herein by reference in their entirety.

BACKGROUND

Technical Field

The present disclosure relates to a sealing device for a differential mechanism, and particularly relates to a sealing device for a differential mechanism that is used for an output shaft of the differential mechanism in vehicles, general purpose machines, and the like.

Background Art

In a vehicle, for example an automobile, a differential mechanism for absorbing a difference in rotational speed between right and left driving wheels during turning of the vehicle is provided. The differential mechanism is housed in a housing of a transaxle or a differential device. In the differential mechanism, a drive force input through a drive shaft is respectively distributed through axles serving as right and left output shafts. In the housing, the axles are supported by bearings, and lubricant for lubricating the difference mechanism and the bearings is stored in the housing. Each of the axles is inserted through a through-hole formed in the housing, and sealing of the through-hole is attempted to be sealed by a sealing device.

FIG. 10 is a cross-sectional view for illustrating a schematic configuration of a conventional sealing device for a differential mechanism (hereinafter simply referred to as a "sealing device") that is used for a differential mechanism. FIG. 11 is a cross-sectional view of the conventional sealing device illustrated in FIG. 10 in a state of being attached to a differential mechanism provided in a transaxle, for example. As illustrated in FIG. 10, a conventional sealing device 100 includes an annular reinforcing ring 101, and an annular elastic body part 102 formed from an elastic body that is integrally formed with the reinforcing ring 101, and the elastic body part 102 includes a seal lip 103, a dust lip 104, and a side lip 105. As illustrated in FIGS. 10, 11, the seal lip 103 is in slidable contact with an axle 111 of a differential mechanism 110 to thereby prevent the lubricant in a housing 112 in which the differential mechanism 110 is housed from leaking out. The dust lip 104 is formed outside the seal lip 103, and is in slidable contact with the axle 111 to thereby prevent foreign matter such as muddy water, rainwater, and dust from entering into the housing 112 from the outer side. As illustrated in FIG. 10, the side lip 105 extends toward the outer side on an outer periphery side of the dust lip 104, and has a conical cylindrical shape that increases in diameter toward an outward side at a constant angle. As illustrated in FIG. 11, the side lip 105, at a distal end edge, slidably contacts a disc-shaped sliding surface 113a, facing the inner side, of an annular deflector 113 fixed to the axle 111 in such a manner that the deflector 113 is slidable, to thereby prevent foreign matter from entering from the outer side. The side lip 105 is elastically deformed and curved in a state of being in contact with the deflector 113, and an inner peripheral surface of the distal end edge is formed so as to be in contact with the sliding surface 113a of the deflector 113.

The sealing device 100 is attached between a through-hole 114 in the housing 112 in which the differential mechanism 110 is housed and the axle 111 inserted through the through-hole 114 in order to seal the through-hole 114, thereby preventing the lubricant stored in the housing 112 from leaking out to the outer side, and preventing the foreign matter from entering into the housing 112 (for example, see Japanese Patent Application Publication No. 2014-126173).

In the conventional sealing device 100 for a differential mechanism as described above, the axle 111 is displaced about an axis of the axle 111 within a minute range during operation based on a gap between members in the differential mechanism 110 and a device such as the transaxle that is provided with the differential mechanism 110, and the axle 111 is displaced from a desired position based on dimensional tolerance and assembly errors of members in the differential mechanism 110 and the device provided with the differential mechanism 110. Therefore, the side lip 105 is further elastically deformed and curved corresponding to the displacement (looseness) of the axle 111 such that a middle portion that is a portion on a root side relative to the distal end of the side lip 105 is in contact with the deflector 113, or the deformation of the side lip 105 is relieved so that the side lip 105 is gently curved to maintain a contact state with the deflector 113 following the movement of the deflector 113, with the result that the prevention of the entering of dust is maintained.

However, when the looseness of the axle 111 of the differential mechanism 110 is large, the side lip 105 is more largely curved, and a contact width between the side lip 105 and the deflector 113 is increased. The side lip 105 is also in contact with the deflector 113 at a middle portion that is a portion closer to the root side, a contact pressure to the deflector 113 is increased at the middle portion, and the contact pressure to the deflector 113 is reduced at the distal end of the side lip 105. As shown in FIG. 12, a difference (pressure difference Δpc) between the contact pressure at the distal end and the contact pressure at the middle portion on the root side is reduced, and the distal end of the side lip 105 may float away from the deflector 113. If the distal end of the side lip 105 repeatedly floats away from the deflector 113 due to the looseness of the axle 111 during operation of the differential mechanism 110, the distal end of the side lip 105 may cause the foreign matter to enter the inner side, and enter the housing 112. In recent years, there has been required a sealing device having a configuration capable of coping with a greater looseness of the axle 111 of the differential mechanism 110, but in the conventional sealing device 100 for a differential mechanism as described above, if a great looseness of the axle 111 occurs in the differential mechanism 110, the contact width is increased, the distal end of the side lip 105 floats away from the deflector 113, and therefore the foreign matter may enter into the inner side of the differential mechanism 110.

As described above, in the conventional sealing device 100 for a differential mechanism, there has been required a configuration capable of preventing the distal end of the side lip 105 from floating away from the deflector 113 even when the contact width is increased.

The present disclosure is related to provide a sealing device for a differential mechanism capable of preventing a distal end of a side lip from floating away from a deflector even when a contact width of the side lip is increased.

SUMMARY

A sealing device for a differential mechanism according to the present disclosure is a sealing device for a differential mechanism for sealing between a through-hole formed in a housing in which the differential mechanism is housed and an output shaft of the differential mechanism that is rotatably inserted through the through-hole. The sealing device for a differential mechanism includes an annular reinforcing ring centered about an axis, and art annular elastic body part formed from an elastic body centered about the axis that is attached to the reinforcing ring. The elastic body part has an annular seal lip that is in contact with the output shaft such that the output shaft is slidable, an annular dust lip that is provided at the outer side of the seal lip, the dust lip is in contact with the output shaft such that the output shaft is slidable, and an annular side lip that extends toward the outer side on an outer periphery side of the dust lip that is in contact with an annular deflector attached to the output shaft such that the deflector is slidable. The side lip has an annular middle portion that increases in diameter toward an outer side in a direction of the axis, and an annular distal end portion that is a portion connected to the middle portion and is the outer side of the middle portion, and increases in diameter toward an outer side in the direction of the axis, in which at least the distal end portion of the distal end portion and the middle portion is in contact with the deflector. And The distal end portion of the side lip is bent to an inner periphery side from the middle portion.

In the sealing device for a differential mechanism according to one aspect of the present disclosure, the distal end portion of the side lip is bent from the middle portion, dimensions of the distal end portion are set, and a physical property of the elastic body forming the elastic body part is set so that a contact pressure to the deflector at the distal end portion with respect to a contact pressure to the deflector at the middle portion is set in a manner such that a contact between the distal end of the side lip and the deflector is not released.

In the sealing device for a differential mechanism according to one aspect of the present disclosure, a thickness of the distal end portion of the side lip is set based on a hardness of the elastic body.

In the sealing device for a differential mechanism according to one aspect of the present disclosure, the distal end portion has a conical cylindrical shape centered about the axis, and the middle portion has a conical cylindrical shape centered about the axis.

In the sealing device for a differential mechanism according to one aspect of the present disclosure, the side lip has an annular root portion that extends in the direction of the axis, and the middle portion is a portion that is connected to the root portion and is outside the root portion.

According to a sealing device for a differential device of the present disclosure, a distal end of a side lip can be prevented from floating away from a deflector even when a contact width of the side lip is increased.

BRIEF DESCRIPTION OF DRAWINGS

FIG. 8A is a diagram illustrating a projection image of the side lip in the evaluation test of the sealing performance, and FIG. 8B is a diagram showing the relationship between the contact position and the contact pressure of the side lip.

FIG. 9A is a diagram illustrating a projection image of the side lip in the evaluation test of the sealing performance, and FIG. 9B is a diagram showing the relationship between the contact position and the contact pressure of the side lip.

DESCRIPTION OF EMBODIMENTS

Hereinafter, embodiments of the present disclosure will be described with reference to the drawings.

Figure 1:
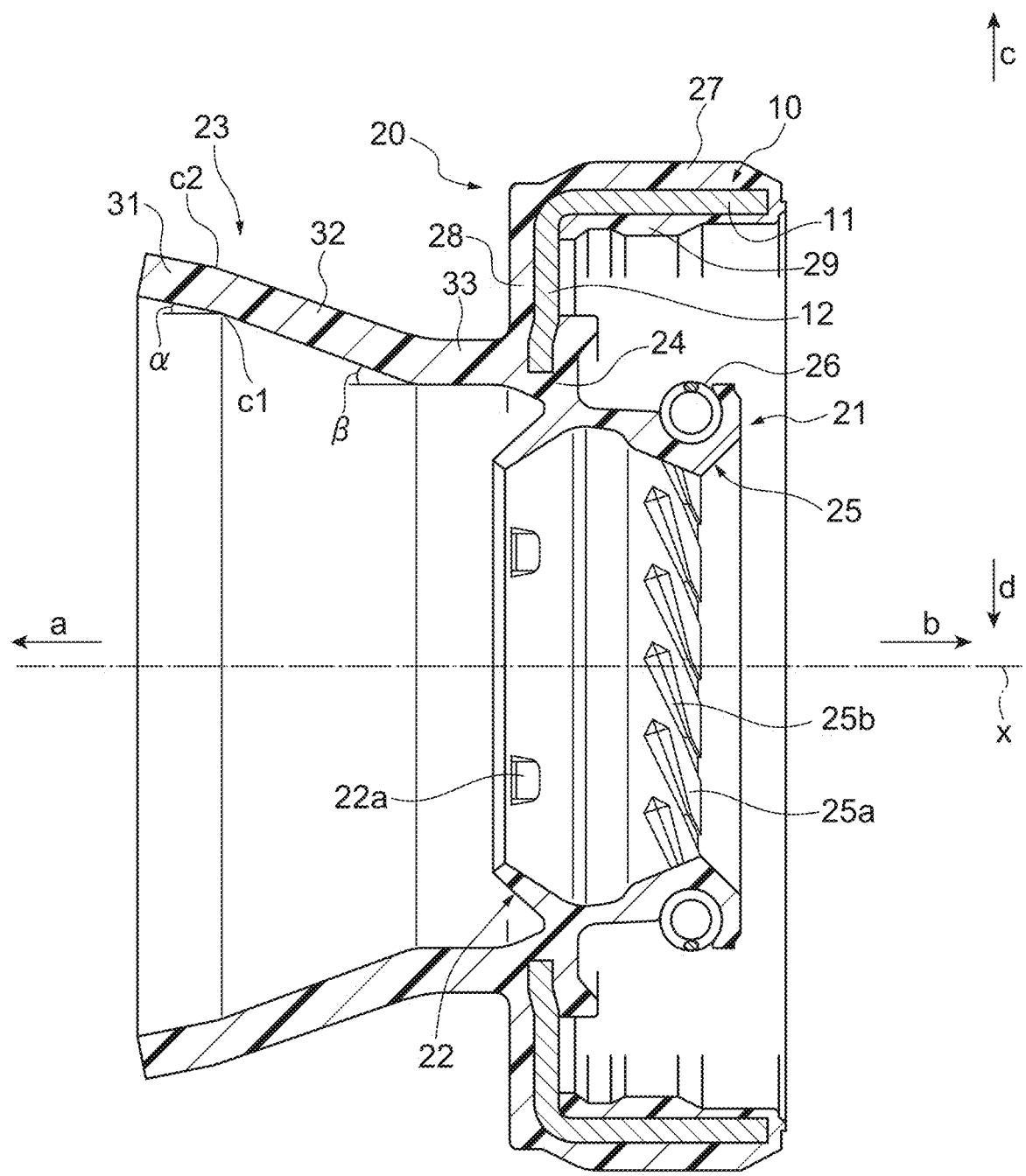
FIG. 1 is a cross-sectional view taken along an axis for illustrating a schematic configuration of a sealing device for a differential mechanism according to an embodiment of the present disclosure.
Figure 2:
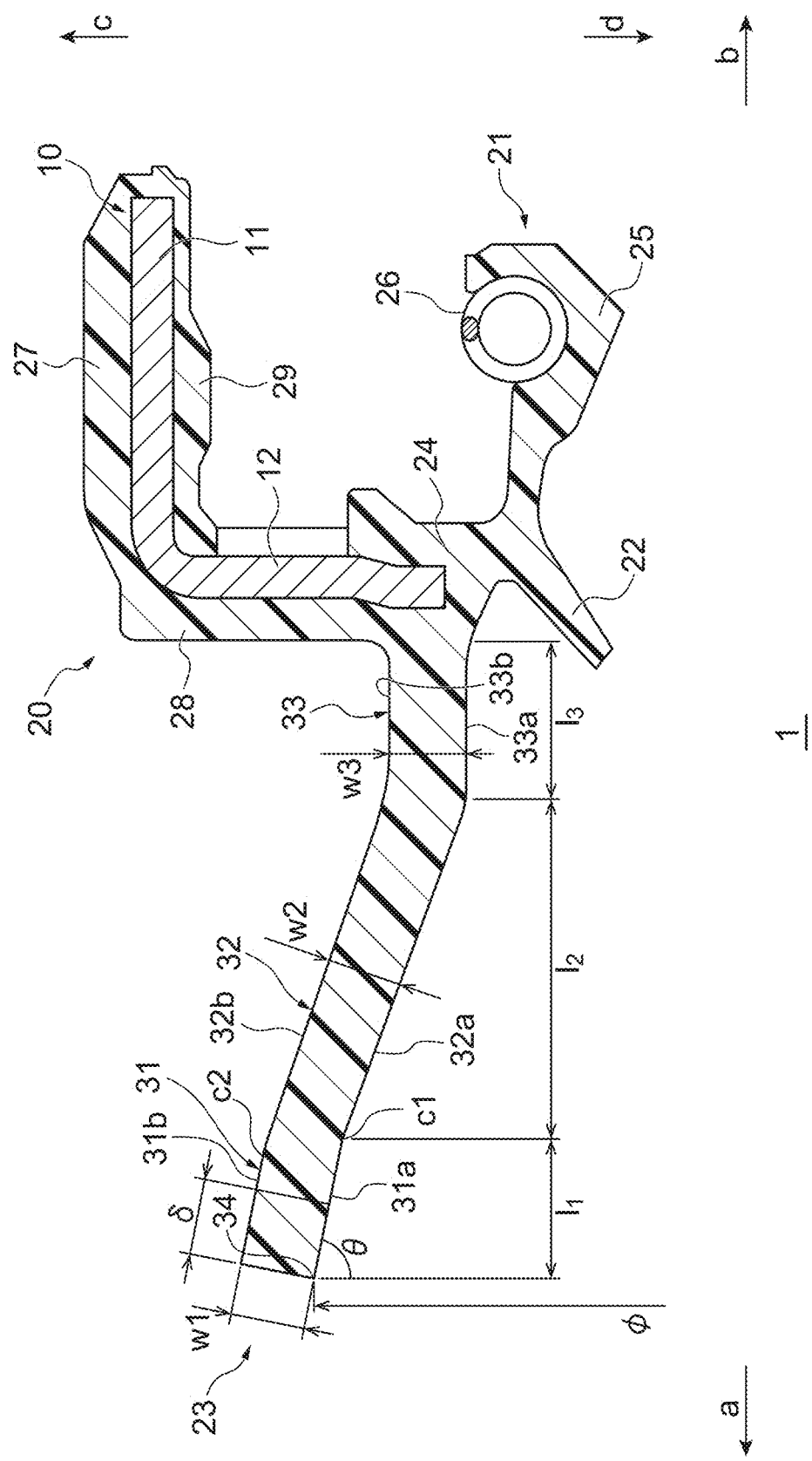
FIG. 2 is a partial enlarged cross-sectional view of the sealing device illustrated in FIG. 1.

FIG. 1 is a cross-sectional view taken along an axis x for illustrating a schematic configuration of a sealing device for a differential mechanism (hereinafter simply referred to as a "sealing device") according to an embodiment of the present disclosure. FIG. 2 is a partial enlarged cross-sectional view of the sealing device illustrated in FIG. 1. A sealing device 1 according to the embodiment of the present disclosure is used for a device provided with a differential mechanism for absorbing a difference in rotational speed between right and left driving wheels during turning of a vehicle, a general purpose machine, or the like. Examples of a device provided with a differential mechanism include a transaxle, a differential device, and in the present embodiment, the sealing device 1 is used for the transaxle. More particularly, in the transaxle, the sealing device 1 is used for sealing between a through-hole formed in a housing and an axle as an output shaft of the differential mechanism that is rotatably inserted through the through-hole, as described later.

Hereinafter, a direction directed by an arrow a in a direction of the axis x (see FIG. 1) represents an outer side, and a direction directed by an arrow b in the direction of the axis x (see FIG. 1) represents an inner side, for convenience of explanation. More particularly, the outer side means a side facing the outside of the housing in the transaxle provided with a differential mechanism, and an atmosphere side, and the inner side means a side facing the inside of the housing in the transaxle. In a direction perpendicular to the axis x (hereinafter also referred to as a "radial direction"), a direction away from the axis x (a direction directed by an arrow c in FIG. 1) represents an outer periphery side, and a direction approaching the axis x (a direction directed by an arrow d in FIG. 1) represents art inner periphery side.

The sealing device 1 includes an annular reinforcing ring 10 centered about the axis x, and an annular elastic body part 20 formed of an elastic body centered about the axis x, as illustrated in FIG. 1. The elastic body part 20 is integrally attached to the reinforcing ring 10. The reinforcing ring 10 is formed of a metal material. Examples of the metal material include stainless steel, and SPCC (cold rolled steel sheet). Examples of the elastic body of the elastic body part 20 include various rubber materials. The various rubber materials are, for example, synthetic rubber such as nitrile rubber (NBR), hydrogenated nitrile rubber (H-NBR), acrylic rubber (ACM), and fluororubber (FKM).

The reinforcing ring 10 is manufactured by press working or forging, for example, and the elastic body part 20 is molded with a mold by cross-linking (vulcanization). During the cross-linking, the reinforcing ring 10 is placed in the mold, the elastic body part 20 is bonded to the reinforcing ring 10 by cross-linking bonding, and the elastic body part 20 is integrally molded with the reinforcing ring 10.

As illustrated in FIGS. 1 and 2, a shape of a cross section along the axis x (hereinafter simply referred to as a "cross section") of the reinforcing ring 10 is a substantially L shape, for example, and the reinforcing ring 10 includes a cylindrical part 11 that is a cylindrical portion extending in the direction of the axis x, and a flange part 12 that is a hollow disc-shaped portion expanding toward the inner periphery side from the outer end portion of the cylindrical part 11. The cylindrical part 11 is formed so as to be able to be fitted to an inner peripheral surface of the through-hole formed in the housing of the transaxle, as described later. The cylindrical part 11 may be directly in contact with the inner peripheral surface of the through-hole to be able to be fitted to the inner peripheral surface of the through-hole, or may be in contact with the inner peripheral surface of the through-hole through a portion of the elastic body part 20 to be able to be fitted to the inner peripheral surface of the through-hole.

As illustrated in FIGS. 1 and 2, the elastic body part 20 is attached to the reinforcing ring 10, and is integrally formed with the reinforcing ring 10 to cover the entire reinforcing ring 10 in the present embodiment. The elastic body part 20 includes an annular seal lip 21, an annular dust lip 22, and an annular side lip 23. The elastic body part 20 also includes an annular lip waist portion 24. The seal lip 21 is formed so as to be in contact with an axle of the differential mechanism so that the axle is slidable, as described later, and the dust lip 22 is provided on the outer side of the seal lip 21 and formed so as to be in contact with the axle so that the axle is slidable. The side lip 23 is formed so as to be in contact with an annular deflector fixed to the axle so that the deflector is slidable, and extends toward the outer side on the outer periphery side of the dust lip 22 as described later. In the elastic body part 20, the lip waist portion 24 is a portion positioned in the vicinity of an end portion on the inner periphery side of the flange part 12 of the reinforcing ring 10.

The seal lip 21 is a portion that extends toward the inner side from the lip waist portion 24, and an annular portion centered about the axis x, and is formed by facing the cylindrical part 11 of the reinforcing ring 10, as illustrated in FIGS. 1 and 2. The seal lip 21 has an annular lip distal end portion 25 at an inner end portion, the lip distal end portion 25 having a cross section formed in a wedge shape projecting toward the inner periphery side. A garter spring 26 is fitted at a position facing away from the lip distal end portion 25 on the outer periphery side of the seal lip 21, and the garter spring 26 presses the lip distal end portion 25 of the seal lip 21 toward the inner periphery side in the radial direction to apply a tensional force of a predetermined magnitude against the axle to the lip distal end portion 25. The lip distal end portion 25 is in contact with an outer peripheral surface of the axle to seal between the sealing device 1 and the axle, as described later. As illustrated in FIG. 1, a plurality of screw projections 25b are spirally formed at an equal angle interval in a circumferential direction on a taper surface 25a of a conical surface shape of the lip distal end portion 25 on the outer side, the screw projections 25b extending diagonally with respect to the distal end of the lip distal end portion 25 and projecting in an inner peripheral direction. The screw projections 25b generate air flow from the outside to the inner side when the axle is slided, to thereby prevent lubricant from leaking from the inside.

The dust lip 22 extends outwardly from the lip waist portion 24 and toward the axis x, more particularly, as illustrated in FIGS. 1, 2, the dust lip 22 extends in a direction toward the outer side and the inner periphery side from the lip waist portion 24. The dust lip 22 prevents foreign matter such as muddy water, sand, and dust from entering in a direction toward the lip distal end portion 25 in the usage state. In the dust lip 22, in order that a negative pressure is not generated in a space between the dust lip 22 and the seal lip 21 in the usage state, a plurality of projections 22a projecting in the inner peripheral direction are formed at an equal angle interval in a circumferential direction so that a gap is formed by partially releasing the contact between the dust lip 22 and the axle to thereby suppress the generation of the negative pressure or eliminate the negative pressure.

The elastic body part 20 includes a gasket part 27, a rear cover part 28, and a lining part 29. In the elastic body part 20, the gasket part 27 is a portion that covers the cylindrical part 11 of the reinforcing ring 10 from the outer periphery side. As described later, the thickness in the radial direction of the gasket part 27 is set so that, when, in the transaxle, the sealing device 1 is pressed into a through-hole through which the axle is inserted, the gasket part 27 is pressed between the through-hole and the cylindrical part 11 of the reinforcing ring 10 in the radial direction so that the gasket part 27 generates a fitting force of a force outward in a radial direction at a predetermined magnitude. The rear cover part 28 is a portion that covers the flange part 12 of the reinforcing ring 10 from the outer side. The lining part 29 is a portion that covers the reinforcing ring 10 from the inner side and the inner periphery side.

Note that the elastic body part 20 is integrally formed of the elastic material, and the seal lip 21, the dust lip 22, the side lip 23, the lip waist portion 24, the gasket part 27, the rear cover part 28, and the lining part 29 are respective portions of the elastic body part 20 that is integrally formed of the elastic material.

As illustrated in FIGS. 1, 2, the side lip 23 includes a distal end portion 31, a middle portion 32, and a root portion 33. The root portion 33 is an annular portion extending in the direction of the axis x. The middle portion 32 is a portion that is connected to the root portion 33 and is on the outer side of the root portion 33, and is an annular portion that increases in diameter toward the outer side in the direction of the axis x. The distal end portion 31 is a portion that is connected to the middle portion 32 and is on the outer side of the middle portion 32, and is an annular portion that increases in diameter toward the outer side in the direction of the axis x. In the side lip 23, the distal end portion 31 is bent to the inner periphery side from the middle portion 32. More particularly, in the elastic body part 20, the side lip 23 extends outwardly from an outer side portion of the lip waist portion 24, and the root portion 33 extends outwardly from the lip waist portion 24. The middle portion 32 extends outwardly from the outer end portion of the root portion 33, and the distal end portion 31 extends outwardly from the outer end portion of the middle portion 32. Note that the side lip 23 may include no root portion 33, and the middle portion 32 may extend from the lip waist portion 24.

An inner peripheral surface $31a$ that is a surface on the inner periphery side of the distal end portion 31 and an inner peripheral surface $32a$ that is a surface on the inner periphery side of the middle portion 32 are connected at an inner peripheral connection portion c1 that forms an annular line. An outer peripheral surface $31b$ that is a surface on the outer periphery side of the distal end portion 31 and an outer peripheral surface $32b$ that is a surface on the outer periphery side of the middle portion 32 are connected in an outer peripheral connection portion c2 that forms an annular line.

More particularly, the distal end portion 31 has a conical cylindrical shape centered about the axis x, the middle portion 32 has a conical cylindrical shape centered about the axis x, and the root portion 33 has a cylindrical shape centered about the axis x. As described above, the distal end portion 31 is bent to the inner periphery side from the middle portion 32 such that an angle (angle $\alpha$) between a generating line of the inner peripheral surface $31a$ or the outer peripheral surface $31b$ of the distal end portion 31 and the axis x is smaller than an angle (angle $\beta$) between a generating line of the inner peripheral surface $32a$ or the outer peripheral surface $32b$ of the middle portion 32 and the axis x (see FIG. 1).

As illustrated in FIG. 2, a thickness of the distal end portion 31, i.e., a width between the inner peripheral surface $31a$ and the outer peripheral surface $31b$ of the distal end portion 31 is a fixed thickness or a substantially fixed thickness w1, and an inclination angle that is an angle between the generating line of the distal end portion 31 and a line that extends in the radial direction and is perpendicular to the axis x is an inclination angle $\theta$. A length in the direction of the axis x of the inner peripheral surface $31a$ of the distal end portion 31 is a length l1. A diameter of the distal end portion 31 at a distal end 34 that is an outer end portion (distal end of the side lip 23) of the inner peripheral surface $31a$ of the distal end portion 31 is a diameter $\phi$.

As illustrated in FIG. 2, a thickness of the middle portion 32, i.e., a width between the inner peripheral surface $32a$ and the outer peripheral surface $32b$ of the middle portion 32 is a fixed thickness or a substantially fixed thickness w2, and a length in the direction of the axis x of the inner peripheral surface $32a$ of the middle portion 32 is a length l2. As illustrated in FIG. 2, a thickness of the root portion 33, i.e., a width between the inner peripheral surface $33a$ and the outer peripheral surface $33b$ of the root portion 33 is a fixed thickness or a substantially fixed thickness w3, and a length in the direction of the axis x of the inner peripheral surface $33a$ of the root portion 33 is a length l3.

As illustrated in FIG. 2, in a connection portion between the distal end portion 31 and the middle portion 32, the inner peripheral connection portion c1 of the inner peripheral surfaces $31a$, $32a$ is positioned on the inner side of the outer peripheral connection portion c2 of the outer peripheral surfaces $31b$, $32b$ in the direction of the axis x. That is, in the distal end portion 31, the inner peripheral surface $31a$ is longer than the outer peripheral surface $31b$ in the direction of the axis x.

In the sealing device 1 in the usage state as described later, the distal end portion 31 of a side lip 23 is bent from the middle portion 32, dimensions of the distal end portion 31 and the middle portion 32 are set, and a physical property of the elastic body forming the elastic body part 20 is set, to set a contact pressure to the deflector at the distal end portion 31 with respect to a contact pressure to the deflector at the middle portion 32 such that the contact between the distal end 34 of the side lip 23 and the deflector is not released. That is, in the differential device, when the axle is displaced due to being loose, and a contact width of the side lip 23 extends to the middle portion 32 beyond the distal end portion 31, the distal end portion 31 is bent from the middle portion 32, and the dimensions of the distal end portion 31 and the middle portion 32 are set, and the physical property of the elastic body of the elastic body part 20 is set such that the contact pressure of the distal end 34 of the side lip 23 with the deflector is larger than the contact pressure of the middle portion 32 with the deflector in this contact width to prevent the distal end 34 of the side lip 23 from floating away from the deflector.

Specifically, the thickness w1 of the distal end portion 31 of the side lip 23 is set based on a hardness of the elastic body forming the elastic body part 20, i.e., based on a hardness of the elastic body forming the side lip 23. More specifically, the hardness of the elastic body forming the side lip 23 and the thickness w1 of the distal end portion 31 are set so that the distal end portion 31 is flexible to prevent the distal end 34 from floating away even when the contact width is increased as described above. The greater the thickness w1 of the distal end portion 31, the more strongly the side lip 23 is in contact with the deflector to enhance the performance of preventing entry of foreign matter from the outside. However, when the deflector is slided, a sliding resistance generated between the side lip 23 and the deflector is increased, thereby easily generating heat. Due to this, the wear and the thermal deterioration of the side lip 23 are accelerated, thereby reducing the durability of the side lip 23. Thus, it is preferable that the thickness w1 of the distal end portion 31 be set in view of the durability of the side lip 23. The thickness w1 of the distal end portion 31 of the side lip 23 is w1=0.7 mm to 1.6 mm, for example.

The inclination angle $\theta$ of the distal end portion 31, the length l1 of the distal end portion 31, and the length l2 of the middle portion 32 are set with respect to each other. Specifically, the inclination angle $\theta$ of the distal end portion 31 is $\theta=60°$ to $85°$, for example, the length l1 of the distal end portion 31 is l1=1.5 mm to 4.5 mm, for example, and the length l2 of the middle portion 32 is $l2 \geq 1.5 \times l1$, for example.

The length l1 of the distal end portion 31 is set to such a length that a contact width $\delta$ in a range where the side lip 23 is in contact with an inner surface (sliding surface) of the deflector does not reach a range of the inner peripheral surface 32a of the middle portion 32 beyond a range of the inner peripheral surface 31a of the distal end portion 31 in a state where the sealing device 1 is attached to a desired position of the transaxle (see FIG. 2). The inclination angle θ of the distal end portion 31 is set to such an angle that the distal end portion 31 that is in contact with the deflector in the transaxle is prevented from being buckled or damaged.

Figure 3:
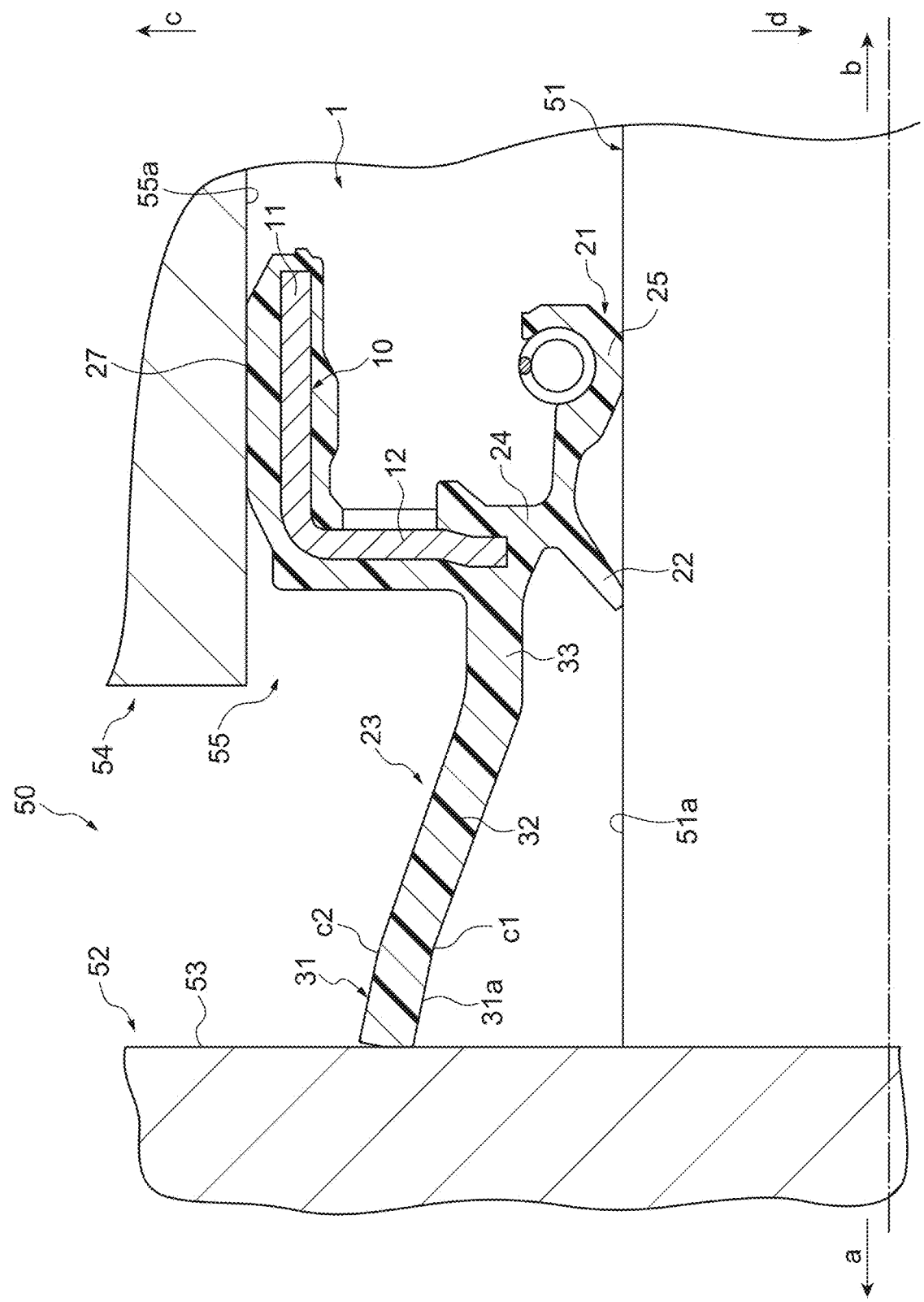
FIG. 3 is a diagram for illustrating the sealing device illustrated in FIG. 1 in a state of being attached to a transaxle housing the differential mechanism, and a partial enlarged cross-sectional view along an axis x enlargedly illustrating a vicinity of the sealing device in the transaxle.
Figure 11:
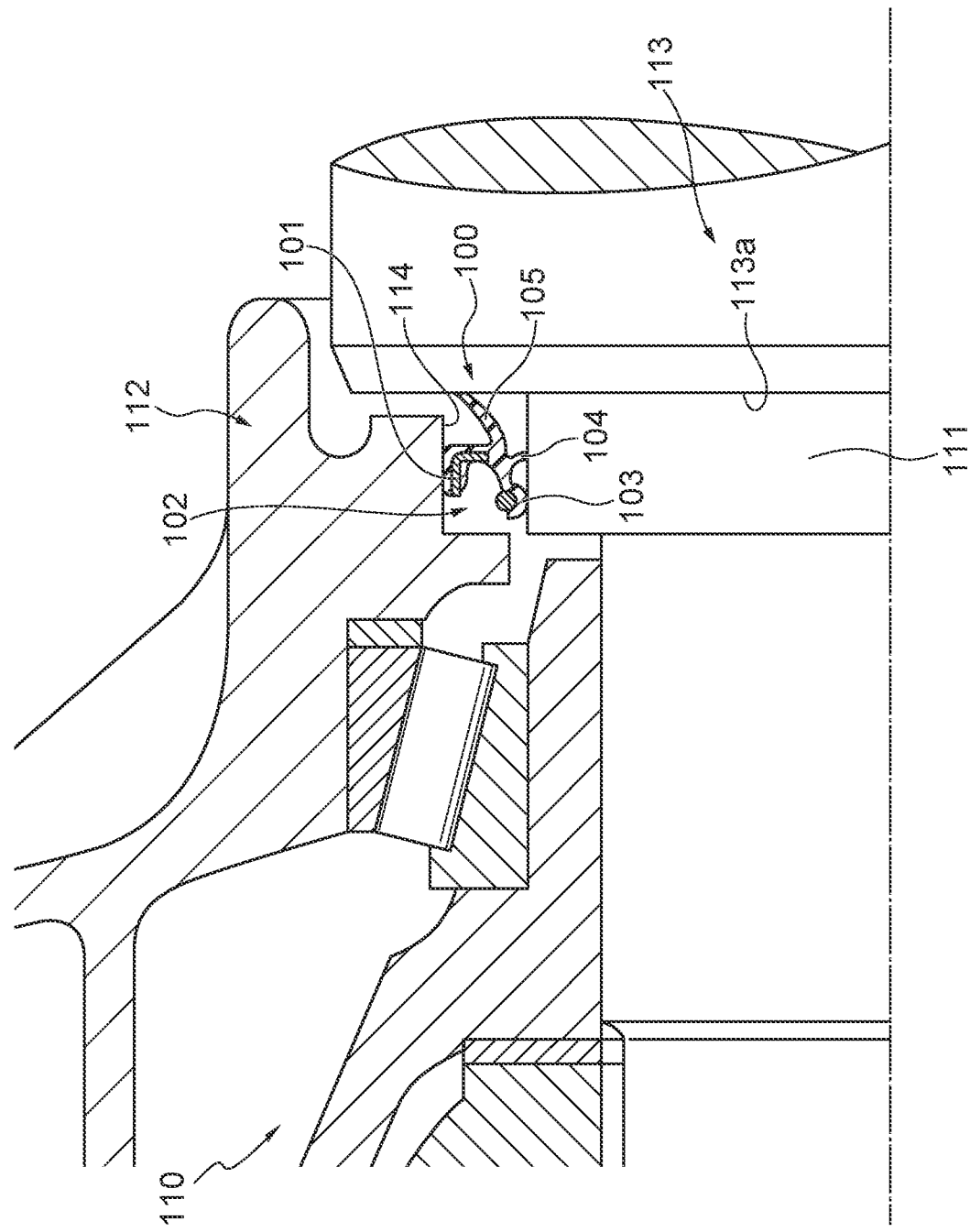
FIG. 11 is a cross-sectional view for illustrating the conventional sealing device for a differential mechanism illustrated in FIG. 10 in a state of being attached to a differential mechanism provided in a transaxle.
Figure 12:
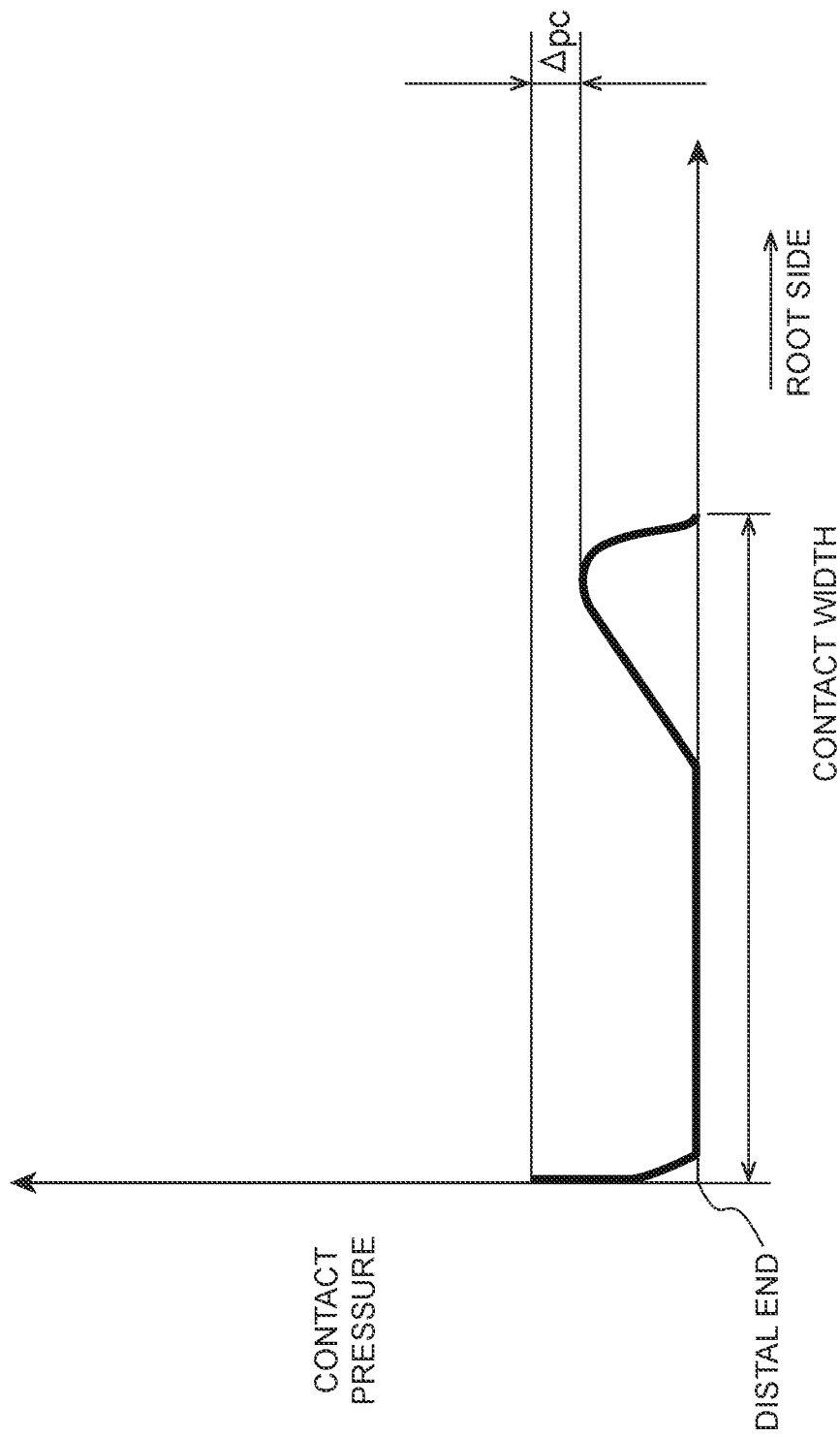
FIG. 12 is a diagram showing a relationship between a contact width and a contact pressure of the side lip with the deflector in the conventional sealing device for a differential mechanism.

Next, operation of the sealing device 1 having the above-described configuration will be described. FIG. 3 is a diagram for illustrating the sealing device 1 in a state of being attached to a transaxle 50, and a partial enlarged cross-sectional view along the axis x enlargedly illustrating the vicinity of the sealing device 1 in the transaxle 50. Note that FIG. 3 illustrates a state where the sealing device 1 is attached to a desired position of the transaxle 50 (hereinafter referred to as an "initial state"). That is, the sealing device 1 is attached to the transaxle 50 in a manner such that the distal end portion 31 of the side lip 23 is in contact with a sliding surface 53 of an annular deflector 52 by a desired contact width δ, the deflector 52 being fixed to an axle 51 as an output shaft of the differential mechanism (not illustrated) of the transaxle 50. The transaxle 50 is a well-known transaxle (see FIG. 11), and a detailed description of the configuration is omitted herein. Note that the deflector 52 may be formed of a member separate from the axle 51, or the deflector 52 may be formed by forming a part of the axle 51 to be annularly projected toward the outer periphery side.

As illustrated in FIG. 3, the sealing device 1 is fitted to a through-hole 55 formed in a housing 54 of the transaxle 50. The axle 51 is rotatably inserted through the through-hole 55. Note that the transaxle 50 is provided with two through-holes and two axles for right and left wheels, but the through-holes and the axles corresponding to respective wheels have similar configurations, respectively, and the through-hole 55 and the axle 51 correspond to each of the right and left wheels, respectively.

In the through-hole 55 in the housing 54, a space between an outer peripheral surface 51a of the axle 51 and an inner peripheral surface 55a of the through-hole 55 is sealed by the sealing device 1. Specifically, the cylindrical part 11 of the reinforcing ring 10 is fitted to the through-hole 55, the gasket part 27 of the elastic body part 20 is compressed between the cylindrical part 11 and the inner peripheral surface 55a of the through-hole 55 so that the gasket part 27 is in close contact with the inner peripheral surface 55a of the through-hole 55, thereby sealing between the sealing device 1 and the through-hole 55 on the outer periphery side. The lip distal end portion 25 of the seal lip 21 of the elastic body part 20 is in contact with the outer peripheral surface 51a of the axle 51 so that the axle 51 is slidable, thereby sealing between the sealing device 1 and the axle 51 on the inner periphery side. Thus, the lubricant stored in the housing 54 is prevented from leaking out to the outside.

The distal end edge of the dust lip 22 is in contact with the outer peripheral surface 51a of the axle 51 so that the axle 51 is slidable, thereby preventing foreign matter from entering into the housing 54 from the outside. In the side lip 23, the distal end edge in the inner peripheral surface 31a in a range of the contact width δ of the distal end portion 31 is in contact with the sliding surface 53 of the deflector 52, thereby preventing the foreign matter from entering into the housing 54 from the outside.

Figure 4:
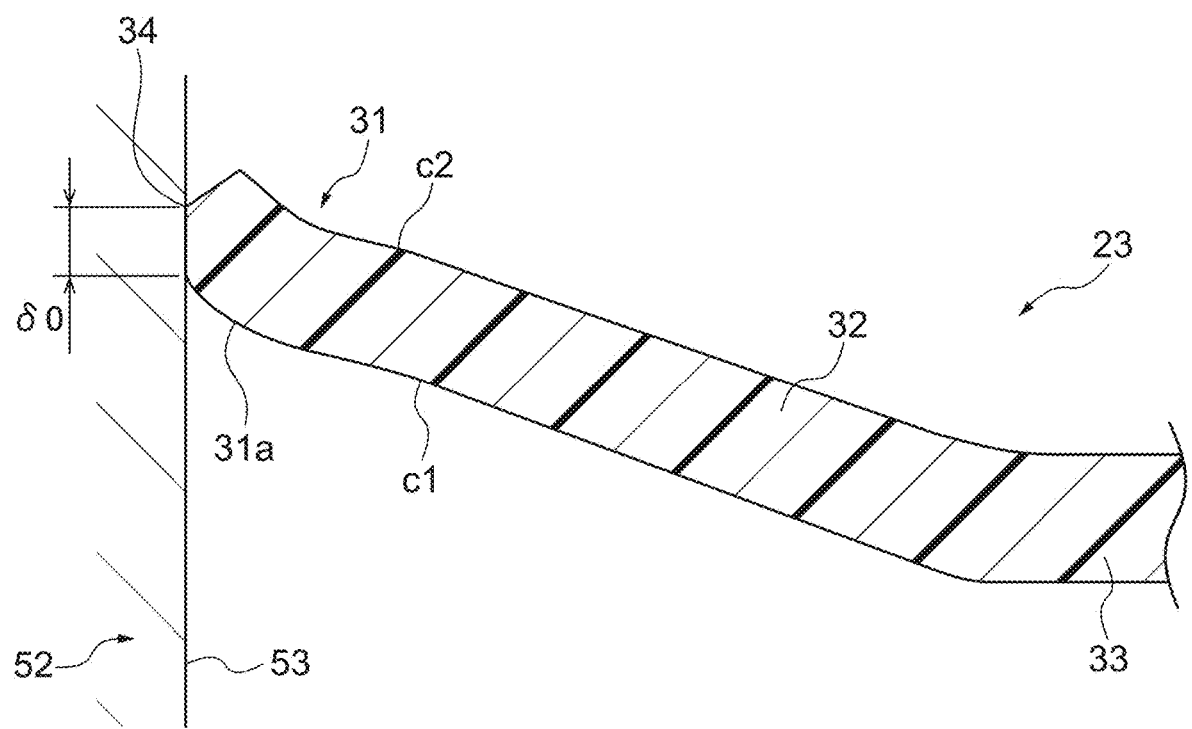
FIG. 4 is an enlarged cross-sectional view of a side lip for illustrating a state of the side lip in a state where the sealing device is attached to a desired position of the transaxle.

FIG. 4 is an enlarged cross-sectional view of the side lip 23 for illustrating a state of the side lip 23 in the initial state. As illustrated in FIG. 4, in the initial state, the distal end portion 31 of the side lip 23 is partially curved or is elastically deformed, and the inner peripheral surface 31a of the distal end portion 31 is in contact with the sliding surface 53 of the deflector 52 in a range of a contact width δ0 from the distal end 34.

Figure 5:
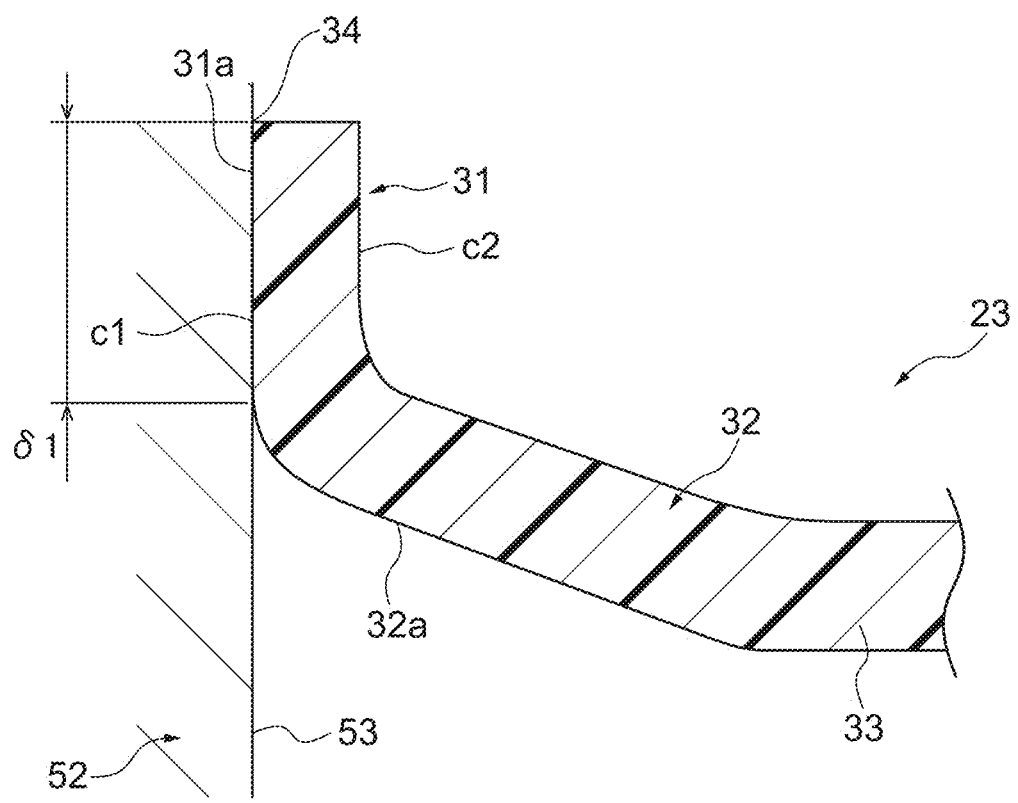
FIG. 5 is an enlarged cross-sectional view of the side lip for illustrating a state of the side lip in a state where an axle of the differential mechanism is displaced.

In the transaxle 50, the axle 51 may be displaced inwardly in the direction of the axis x so that the sliding surface 53 of the deflector 52 is displaced in the direction of the axis x, or the axle 51 may be inclined with respect to the axis x so that the sliding surface 53 of the deflector 52 may be inclined, due to dimensional tolerance and assembly errors of each configuration. When the transaxle 50 is operated, the axle 51 may be displaced in the direction of the axis x or displaced diagonally with respect to the axis x based on the gap between respective configurations. If such a displacement (looseness) occurs, the contact width δ of the side lip 23 with respect to the deflector 52 is increased as illustrated in FIG. 5. In the side lip 23 in the sealing device 1, the distal end portion 31 is bent from the middle portion 32 on the root side toward the inner periphery side as described above. Thus, even when the contact width δ is increased, the contact pressure of the distal end 34 with respect to the deflector 52 is not largely reduced, and a difference between the contact pressure of the distal end 34 with respect to the deflector 52 and the contact pressure of the portion on the root side does not become so small that the distal end 34 of the side lip 23 floats away from the sliding surface 53 of the deflector 52.

Figure 6:
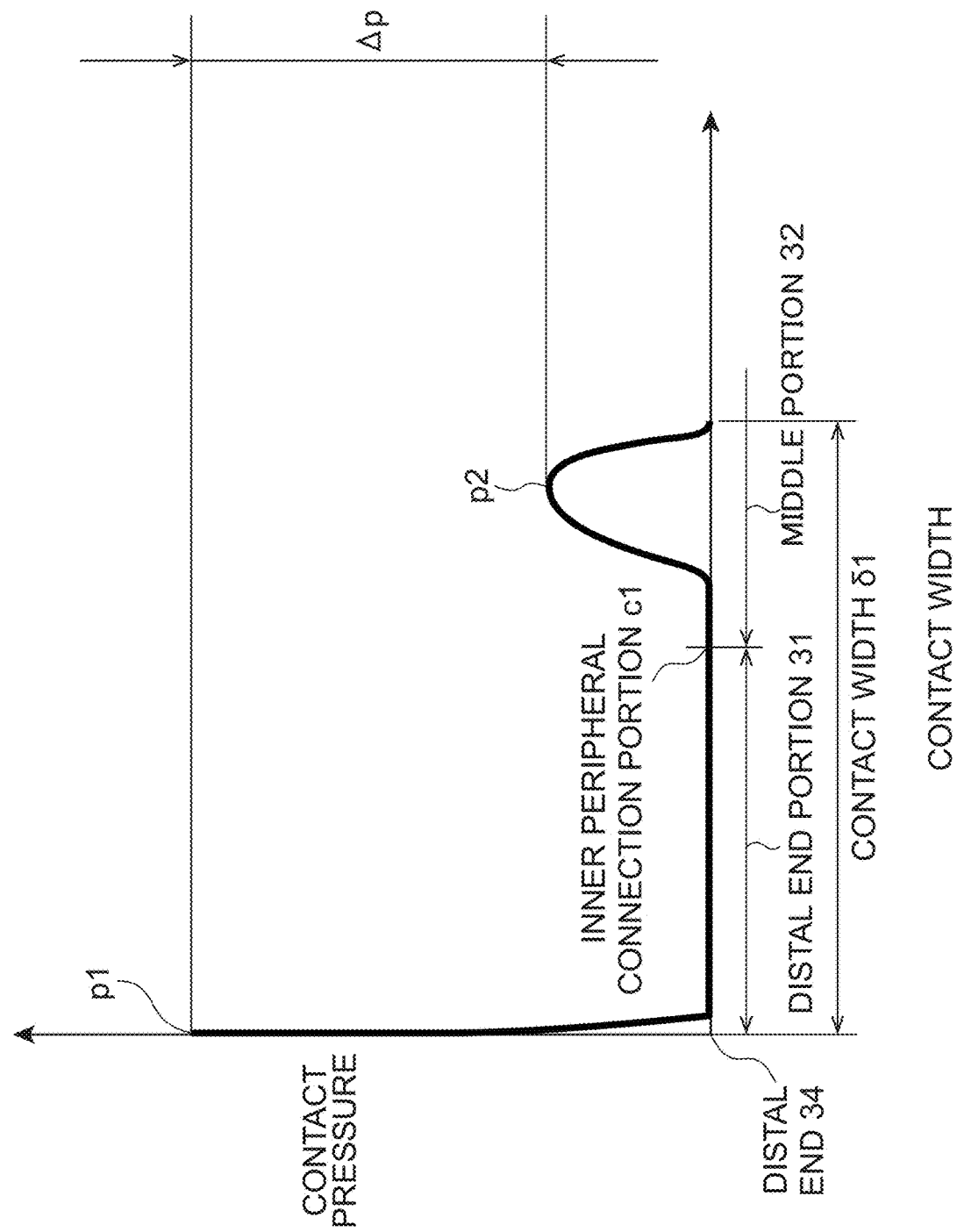
FIG. 6 is a diagram of a graph showing a relationship between a contact width and a contact pressure of the side lip with a deflector in a state illustrated in FIG. 5.

Specifically, as illustrated in FIG. 5, even when a considerable looseness occurs in the axle 51, and the contact width δ is increased and becomes a contact width δ1 in which the side lip 23 contacts the sliding surface 53 of the deflector 52 at also the inner peripheral surface 32a of the middle portion 32 beyond the inner peripheral surface 31a of the distal end portion 31 toward the root side, the distal end 34 can be prevented from floating away from the sliding surface 53 of the deflector 52. In the state of the larger contact width δ1 as illustrated in FIG. 5, in the side lip 23, a contact pressure p1 of the distal end 34 with respect to the deflector 52 is not largely reduced, and a difference Δp between the contact pressure p1 and a contact pressure p2 at a portion of the middle portion 32 on the root side can be prevented from becoming so small that the distal end 34 floats away from the sliding surface 53 of the deflector 52, as illustrated in FIG. 6.

Next, the sealing performance of the sealing device 1 having the above-described configuration will be described. Specifically, the sealing device 1 according to the embodiment of the present disclosure and the conventional sealing device 100 illustrated in FIGS. 10 and 11 were subjected to the evaluation test of the sealing performance, to evaluate the presence of floating of the side lip 23, 105 away from the deflector 52, 113, and a relationship between the contact pressure and the contact position of the side lip 23, 105 with respect to the deflector 52, 113.

Figure 7:
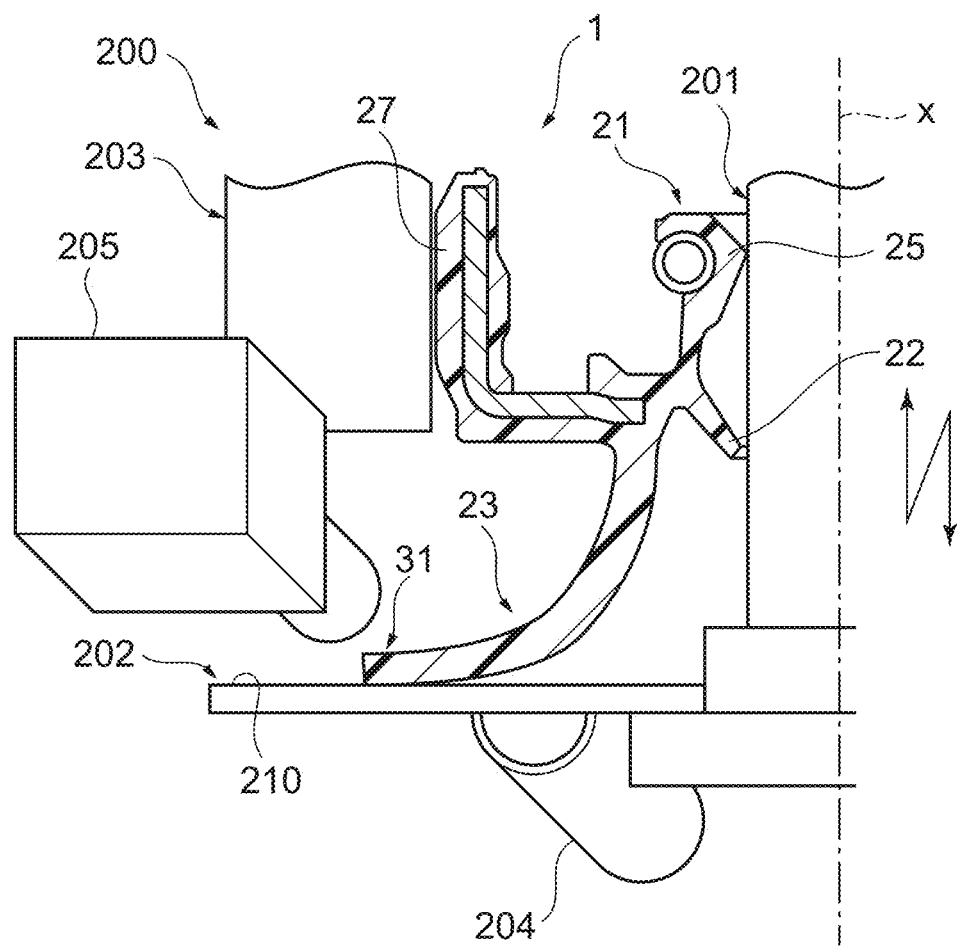
FIG. 7 is a diagram for illustrating a schematic configuration of a sealing performance tester used for an evaluation test of sealing performance in the sealing device for a differential mechanism.
Figure 8A:
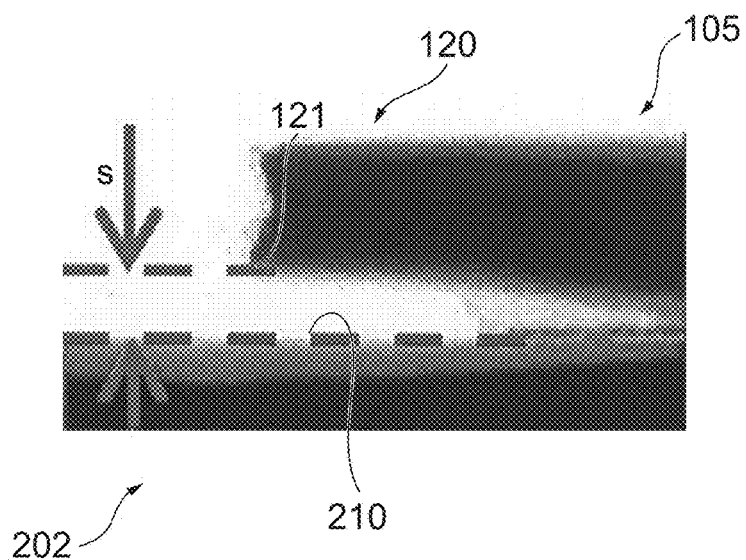
FIGS. 8A and 8B are diagrams for showing results of the evaluation test of the sealing performance of a conventional sealing device.
Figure 8B:
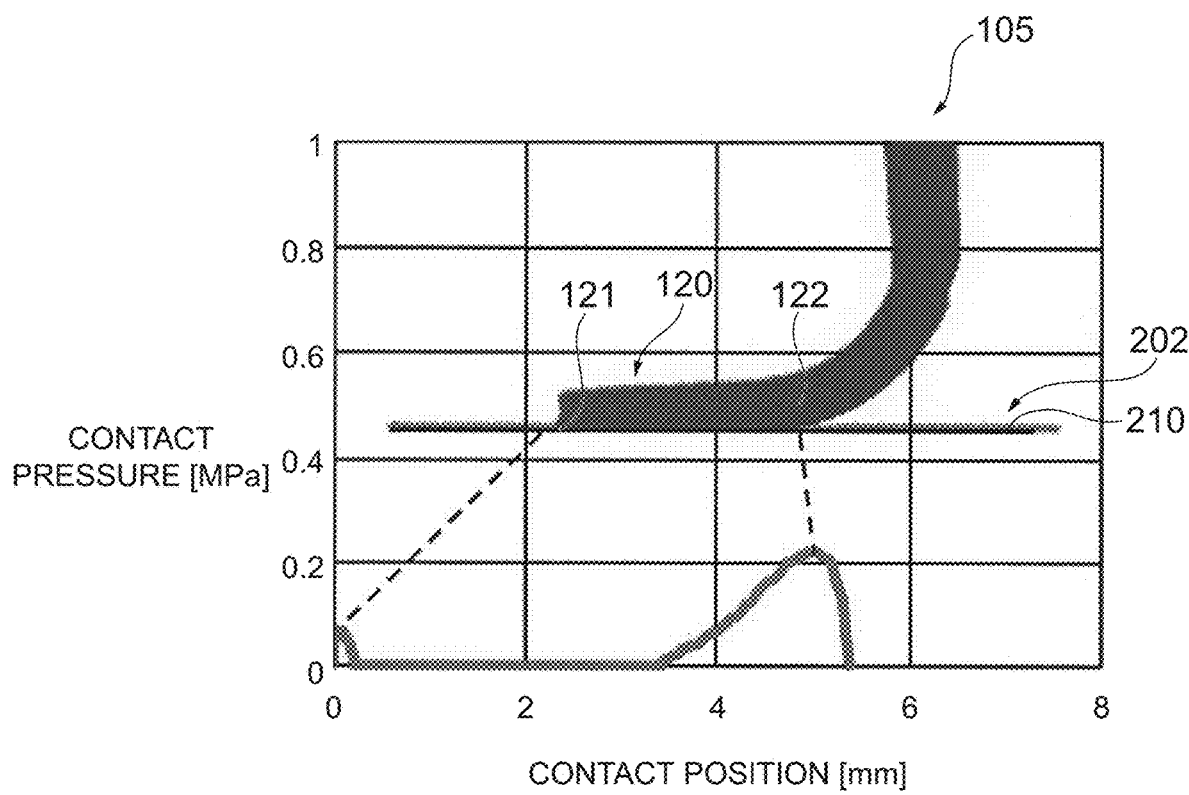
Figure 9A:
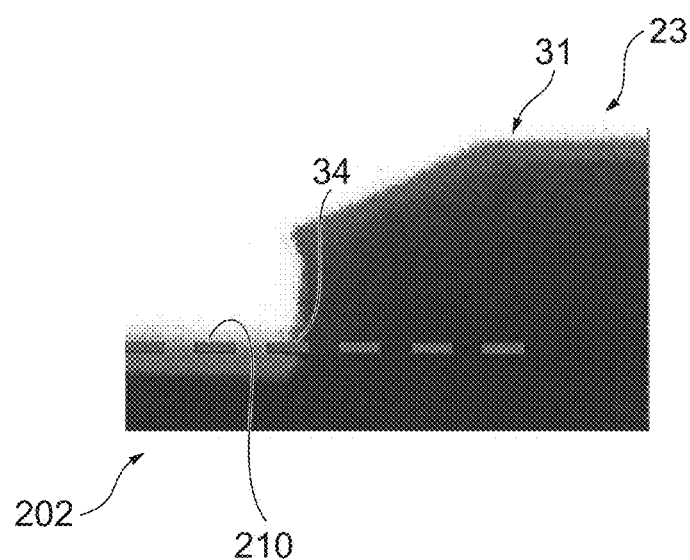
FIGS. 9A and 9B are diagrams for showing results of the evaluation test of the sealing performance of the sealing device according to the embodiment of the present disclosure.
Figure 9B:
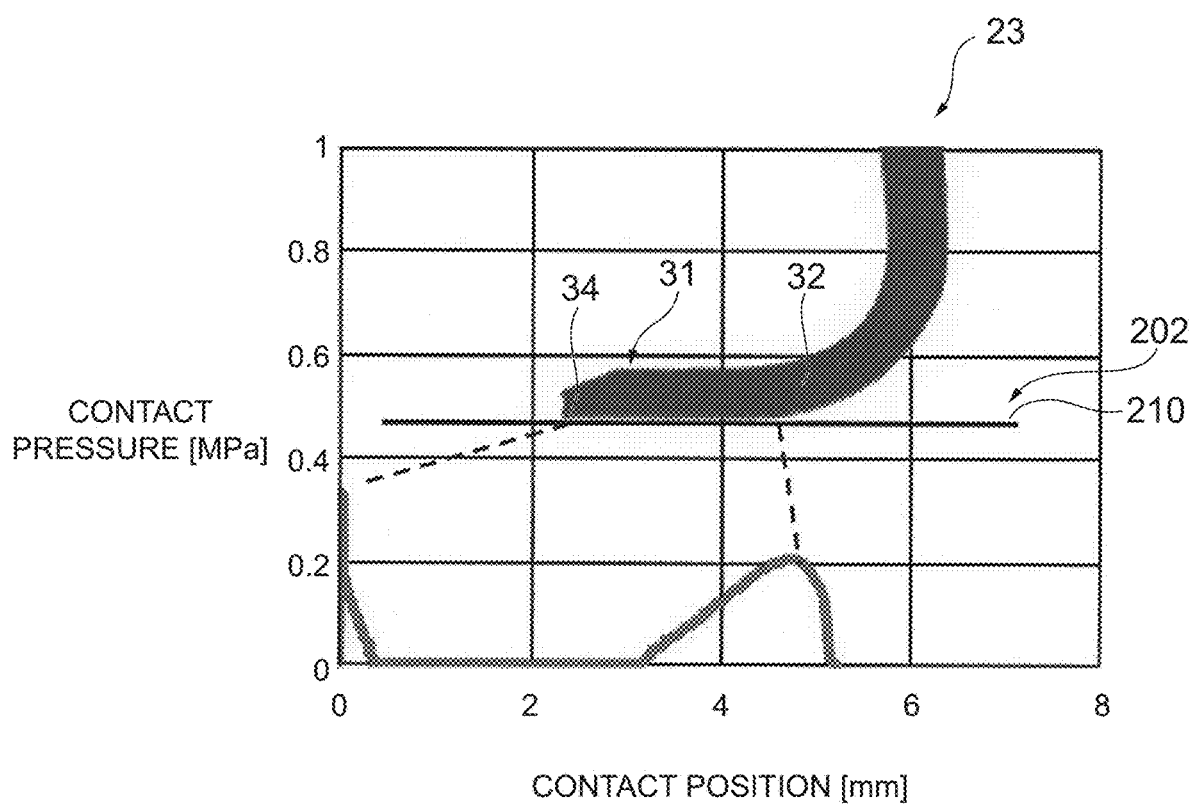
Figure 10:
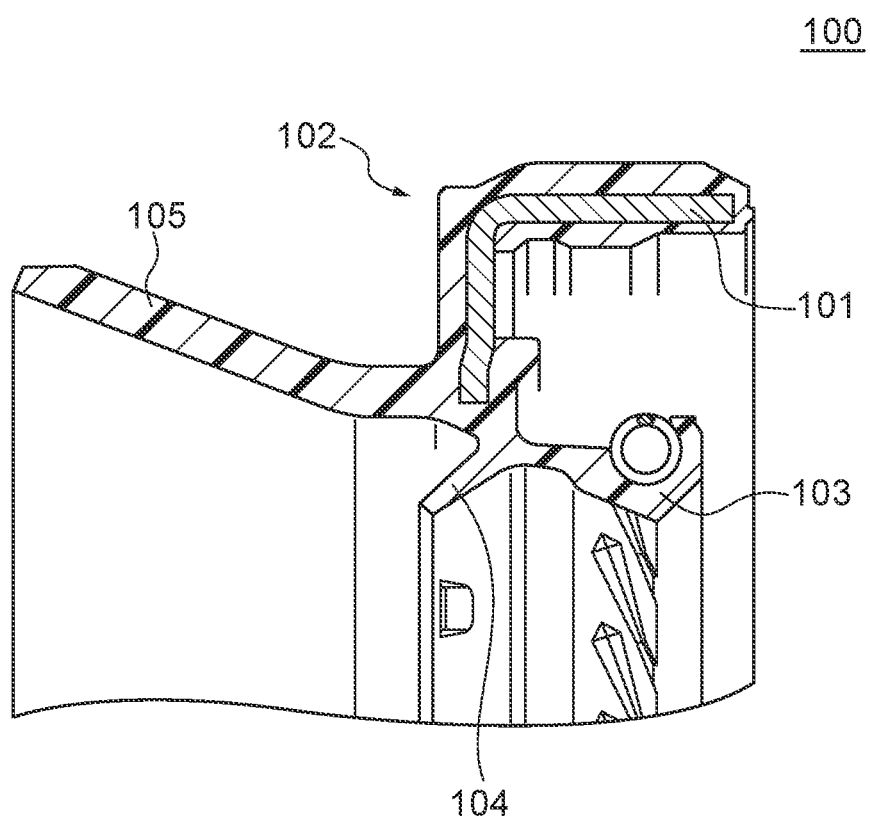
FIG. 10 is a cross-sectional view for illustrating a schematic configuration of a conventional sealing device for a differential mechanism that is used for a differential mechanism.

In the evaluation test of the sealing performance, each of the sealing device 1 and the conventional sealing device 100 was attached to a sealing performance tester 200 illustrated in FIG. 7, and the presence of the floating of the distal end portion of the side lip 23, 105 and the relationship between the contact pressure and the contact position were evaluated. The evaluation test and the evaluation results will be described with reference to FIGS. 7 to 9A, 9B. FIG. 7 is a diagram for illustrating a schematic configuration of the sealing performance tester 200 used for the above-described evaluation test of the sealing performance. FIGS. 8A and 8B are diagrams for showing results of the evaluation test of the sealing performance of the conventional sealing device 100 illustrated in FIG. 10, FIG. 8A is a diagram illustrating a projection image of the side lip 105 in the evaluation test of the sealing performance, and FIG. 8B is a diagram showing the relationship between the contact position and the contact pressure of the side lip 105. FIGS. 9A and 9B are diagrams for showing results of the evaluation test of the sealing performance of the sealing device 1 according to the embodiment of the present disclosure, FIG. 9A is a diagram illustrating a projection image of the side lip 23 in the evaluation test of the sealing performance, and FIG. 9B is a diagram showing the relationship between the contact position and the contact pressure of the side lip 23.

As illustrated in FIG. 7, the sealing performance tester 200 used for the above-described evaluation test of the sealing performance includes an axle corresponding part 201 corresponding to the axle 51 with which the lip distal end portion 25 of the seal lip 21 and the dust lip 22 can be in contact, a deflector corresponding part 202 corresponding to the deflector 52 with which the distal end 34 of the side lip 23 can be in contact, and a housing corresponding part 203 corresponding to the housing 54 to which the gasket part 27 is fitted. That is, the sealing performance tester 200 is configured to be able to reproduce the state where the sealing device 1 is attached to the transaxle 50 (see FIG. 3) using the axle corresponding part 201 corresponding to the axle 51, the deflector corresponding part 202 corresponding to the deflector 52, and the housing corresponding part 203 corresponding to the housing 54.

The sealing performance tester 200 includes a light source 204 that emits light to the side lip 23, and an imaging part 205 that emits a projection image of the side lip 23 irradiated with light at a position facing the light source 204. Note that FIG. 7 illustrates a case where the sealing device 1 is attached to the sealing performance tester 200, but, to perform the evaluation test of the sealing performance of the conventional sealing device 100 illustrated in FIG. 10 and FIG. 11, the conventional sealing device 100 can be also attached to the sealing performance tester 200. That is, the sealing performance tester 200 is configured to be able to reproduce the state where the conventional sealing device 100 is attached to the transaxle (see FIG. 11) using the axle corresponding part 201, the deflector corresponding part 202, and the housing corresponding part 203.

The axle corresponding part 201 of the above-described sealing performance tester 200 can reciprocate at a predetermined speed and a predetermined amplitude in the direction of the axis x by a motor (not illustrated) and, by this reciprocation, the displacement of the axle 51 can be reproduced. In the evaluation test of the sealing performance, the axle corresponding part 201 was made to reciprocate in the direction of the axis x to thereby make the deflector corresponding part 202 reciprocate in the direction of the axis x, and then the projection image of the side lip 23, 105 was imaged by the imaging part 205 when a sliding surface corresponding part 210 reciprocated in the direction of the axis x, then the contact state of the side lip 23, 105 was observed. In the evaluation test, the axle corresponding part 201 was moved by a moving width of 2.81 mm and at a moving speed of 4 Hz in the direction of the axis x. In the evaluation test, the axle corresponding part 201 was made reciprocate at a width of 2.81 mm as a whole inwardly and outwardly in the direction of the axis x making as a reference position the state where the side lip 23, 105 is in contact with the sliding surface corresponding part 210 at a maximum interference of the predetermined interference width.

FIGS. 8A, 8B and FIGS. 9A, 9B show the results of the evaluation tests of the conventional sealing device 100 and the sealing device 1 according the embodiment of the present disclosure, respectively. FIGS. 8A, 8B and FIGS. 9A, 9B show the states of side lip 105, 23 in a state where the axle corresponding part 201 is moved by the maximum width inwardly from the reference position, that is, a state where the side lip 23, 105 is maximally pressed against the sliding surface corresponding part 210.

As illustrated in FIG. 8A, in the conventional sealing device 100, a gap s was found between the distal end 121 of the side lip 105 and the sliding surface corresponding part 210 of the deflector corresponding part 202. As shown in FIG. 8B, in the conventional sealing device 100, it was found that when the contact width of the side lip 105 reaches the middle portion 122 beyond the distal end portion 120, the contact pressure of the side lip 105 with the sliding surface corresponding part 210 becomes the maximum at the middle portion 122, and the contact pressure at the distal end 121 is greatly lower than the contact pressure at the middle portion 122.

On the other hand, as illustrated in FIG. 9A, in the sealing device 1 according to the embodiment of the present disclosure, it was found that the distal end 34 of the side lip 23 does not float away from the sliding surface corresponding part 210 of the deflector corresponding part 202. As shown in FIG. 9B, in the sealing device 1, it was found that when the contact width of the side lip 23 reaches the middle portion 32 beyond the distal end portion 31, the contact pressure of the side lip 23 with the sliding surface corresponding part 210 becomes the maximum at the distal end 34, and the contact pressure at the distal end 34 is larger than the contact pressure at the middle portion 32, resulting that the distal end 34 does not float away from the sliding surface corresponding part 210.

Thus, in the sealing device 1, the distal end portion 31 that is a portion on the distal end side of the side lip 23 is bent toward the inner side with respect to the middle portion 32, and therefore the contact pressure of the distal end 34 of the side lip 23 with respect to the deflector 52 can be prevented from being reduced even when the contact width $\delta$ of the side lip 23 with respect to the sliding surface 53 of the deflector 52 is increased because of a large looseness of the axle 51. Thus, the contact pressure of the distal end 34 of the side lip 23 with respect to the deflector 52 can be maintained at a magnitude larger than the contact pressure of a portion on the root side in the contact width range of the side lip 23 so that the distal end 34 does not float away from the sliding surface 53 of the deflector 52. Accordingly, the distal end 34 of the side lip 23 can be prevented from floating away from the sliding surface 53 of the deflector 52 even when the contact width $\delta$ is increased, and further the foreign matter can be prevented from entering the inside over the side lip 23.

Thus, according to the sealing device 1 for a differential mechanism according to the embodiment of the present disclosure, the distal end 34 of the side lip 23 can be prevented from floating away from the deflector 52 even when the contact width $\delta$ of the side lip 23 is increased.

Although the embodiment of the present disclosure has been described above, the present disclosure is not limited to the sealing device 1 for a differential mechanism according to the embodiment of the present disclosure, and includes any modes falling within the scope of the concept and claims of the present disclosure. Respective configurations may be appropriately selectively combined to solve at least part of the above-described problems and achieve at least part of the above-described effects. For example, in the above-described embodiment, the shape, material, arrangement, size and the like of each component can be appropriately changed according to a specific use mode of the present disclosure.

The invention claimed is:

1. A sealing device for a differential mechanism for sealing between a through-hole formed in a housing in which the differential mechanism is housed and an output shaft of the differential mechanism that is rotatably inserted through the through-hole, the sealing device comprising:

an annular reinforcing ring centered about an axis; and an annular elastic body part formed from an elastic body centered about the axis that is attached to the reinforcing ring, wherein the elastic body part includes an annular seal lip for slidable contact with the output shaft, an annular dust lip that is provided further on an outer side of the sealing device than the seal lip for slidable contact with the output shaft, and an annular side lip that extends toward the outer side of the sealing device on an outer periphery side of the dust lip and for slidable contact with an annular deflector attached to the output shaft, wherein an inner side of the sealing device is a side for facing a lubricant of the housing, and the outer side is a side for facing an outside of the housing, wherein the outer side axially opposes the inner side, wherein the side lip has an annular middle portion that increases in diameter along the axis in a direction toward the outer side of the sealing device, and an annular distal end portion that is a portion connected to the middle portion and is arranged further on the outer side of the sealing device than the middle portion, and increases in diameter along the axis in the direction toward the outer side of the sealing device, wherein at least the distal end portion is capable of contact with the deflector, wherein the elastic body part includes a lip waist portion from which the seal lip, the dust lip and the side lip directly extend, the lip waist portion being a portion positioned proximate to an end portion on an inner periphery side of the reinforcing ring, wherein the side lip and the seal lip extend away from the lip waist portion toward opposite sides with respect to one another, wherein the distal end portion is a portion where the side lip is bent to an inner periphery side from the middle portion, wherein the reinforcing ring does not radially overlap the side lip, wherein the reinforcing ring radially overlaps the seal lip, and wherein, in a connection portion between the distal end portion and the middle portion, an inner peripheral connection portion is a point on an inner peripheral side thereof where the distal end portion is bent from the middle portion, and an outer peripheral connection portion is a point on an outer peripheral side thereof where the distal end portion is bent from the middle portion, and the inner peripheral connection portion is disposed axially closer to the inner side than the outer peripheral connection portion.

2. The sealing device according to claim 1, wherein dimensions of the distal end portion are set, and a physical property of the elastic body forming the elastic body part is set such that the side lip is capable of maintaining contact between the distal end portion of the side lip and the deflector.

3. The sealing device according to claim 2, wherein a thickness of the distal end portion of the side lip is set based on a hardness of the elastic body.

4. The sealing device according to claim 1, wherein the distal end portion has a substantially conical, tubular shape centered about the axis, and the middle portion has a substantially conical, tubular shape centered about the axis.

5. The sealing device according to claim 1, wherein the side lip has an annular root portion that extends in the direction of the axis, and the middle portion is a portion that is connected to the root portion and is outside the root portion.

6. The sealing device according to claim 1, wherein a lip distal end portion of the seal lip is not radially aligned with the waist portion.

7. The sealing device according to claim 1, wherein a thickness of the distal end portion of the side lip is a fixed thickness or a substantially fixed thickness, and a thickness of the middle portion of the side lip is a fixed thickness or a substantially fixed thickness.

8. The sealing device according to claim 1, wherein an inclination angle which is an angle between the distal end portion of the side lip and a line perpendicular to the axis is in a range of 60° to 85°.

9. The sealing device according to claim 1, wherein the reinforcing ring includes a cylindrical part extending in the direction of the axis and a flange part expanding toward the inner periphery side from an outer end portion of the cylindrical part so that a shape of a cross section along the axis of the reinforcing ring is a substantially L shape.

10. The sealing device according to claim 9, wherein the lip waist portion is positioned in a vicinity of an end portion on the inner periphery side of the flange part.

11. The sealing device according to claim 1, wherein the side lip extends outwardly from the lip waist portion.

12. The sealing device according to claim 1, wherein the seal lip extends toward the inner side from the lip waist portion.

13. The sealing device according to claim 1, wherein the seal lip has an annular lip distal end portion at an inner end portion, the lip distal end portion having a cross section formed in a wedge shape projecting toward the inner periphery side, and wherein a garter spring is fitted at a position facing away from the lip distal end portion on an outer periphery side of the seal lip.

* * * * *